Sept. 29, 1953   L. S. HEYM   2,653,456
UNIVERSAL JOINT
Filed Nov. 8, 1950
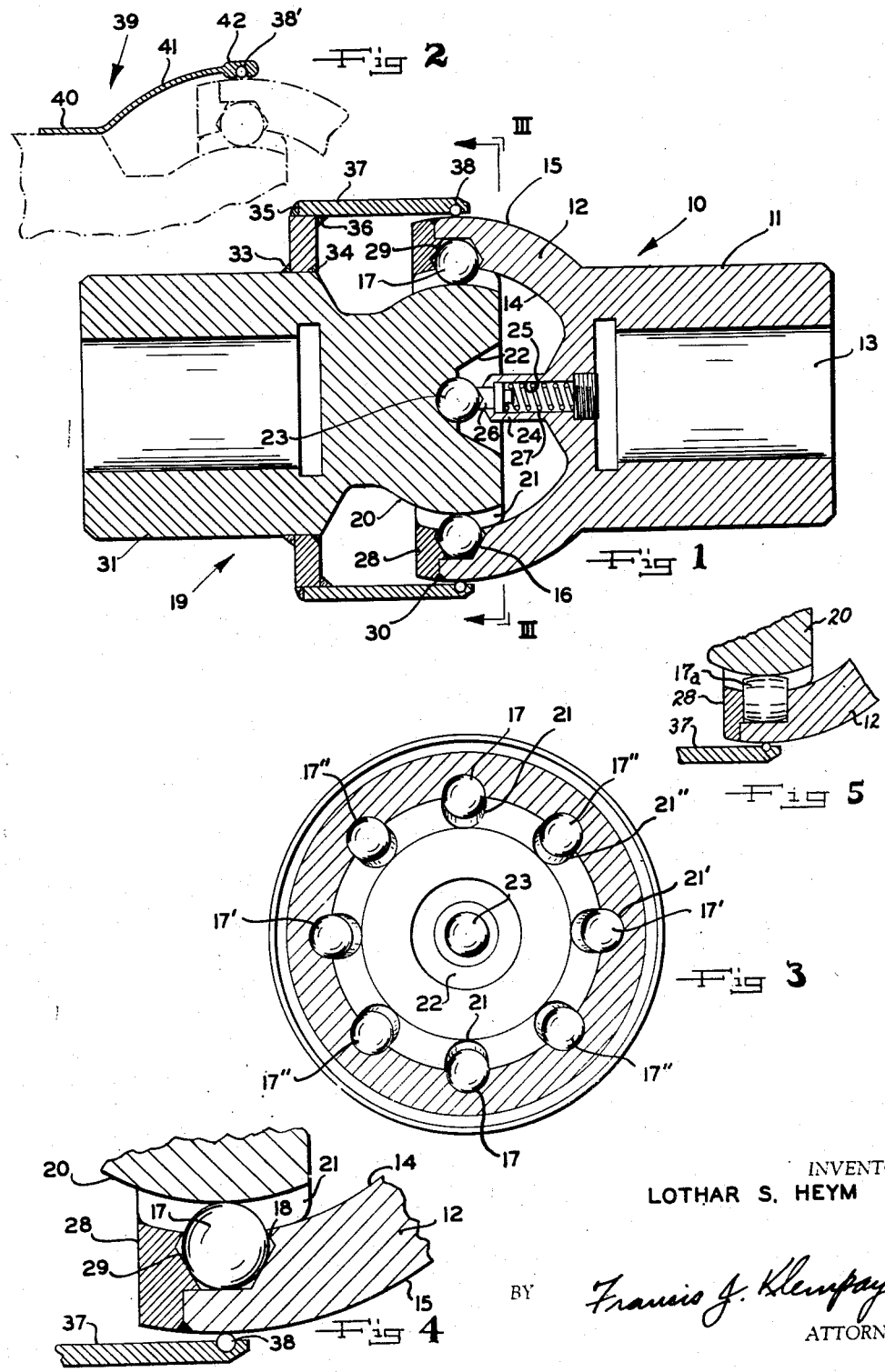
INVENTOR
LOTHAR S. HEYM
BY Francis J. Klempay
ATTORNEY Patented Sept. 29, 1953

2,653,456

UNITED STATES PATENT OFFICE 2,653,456

UNIVERSAL JOINT

Lothar S. Heym, Youngstown, Ohio

Application November 8, 1950, Serial No. 194,715

2 Claims. (Cl. 64—7)

This invention relates to universal joints and more particularly to a joint of this type which is of extreme simplicity of construction and operation yet very closely approximates constant ratio transmission. Since the invention of the Hooke type universal joint much development work has been done on universal drives of the constant velocity or, more accurately stated, constant ratio type. As a result a variety of universal drives has been developed to accomplish this end. As is well known, however, all are quite complicated in structure and require much intricate machining work to manufacture. As an example, the greater majority of constant ratio drives have a travelling cage to hold balls in alignment, and as means of properly positioning the cage, crossed helical grooves are often utilized, though frequently a special device is positioned within the joint to tilt the cage in proper angular relation to the transmission members. Whichever method is used, precise and costly machine work is involved, which tends to render the cost of such joints prohibitive for common applications. It is accordingly the primary object of my invention to provide a universal type joint which will approximate constant ratio transmission closely enough for most practical purposes yet is of extreme simplicity of design and construction.

A further object of this invention is the provision of suitable means whereby the male and female torque transmitting members of my joint are constantly kept under a slight tension so that as the mating parts become worn through extensive use any sloppiness which might otherwise occur is automatically taken up within the joint itself. Thus the longevity of a joint constructed according to my principles is considerably increased.

A further object of my invention is the provision of a totally enclosed joint of the character described which is generally of welded construction to thereby substantially reduce the machining operations necessary for its manufacture.

Other objects and advantages of the invention will become apparent upon full consideration of the following specification and accompanying detailed drawing wherein there are disclosed certain preferred embodiments of my invention.

In the drawings

Figure 1 is an axial section of a universal joint constructed according to the principles of my invention;

Figure 2 is a fragmentary sectional view shown partially in phantom outline, of the universal joint of Figure 1 showing an alternative type of lubricant seal;

Figure 3 is a sectional view taken along the line III—III of Figure 1 showing the general configuration of the driving balls;

Figure 4 is an enlarged fragmentary sectional view of the universal joint of Figure 1 showing details of its construction; and Figure 5 is an enlarged fragmentary sectional view of the universal joint showing an alternate construction wherein the driving balls are replaced by barrel type rollers;

Referring to Figure 1, which most clearly illustrates my invention, the reference numeral 10 denotes the female torque transmitting member of my joint. As is shown by the figure, the female member 10 has at its inner end a bulbous socket, the internal and external surfaces 14 and 15 respectively of which have been ground to spherical contours. In accordance with the principles of the invention I have provided a multiplicity of circumferentially spaced axial bores 16 in the spherical wall section 12 bounded by the ground surfaces 14 and 15. The axial bores 16 are positioned radially in such a manner that the center lines of the bores are spaced only slightly outward of the internal spherical surface 14. As shown in Figure 3 the bores 16 are adapted to loosely retain balls 17, 17' and 17''; their depth and diameter are, therefore, determined accordingly. The balls are restricted against inward radial movement by a lip 18 which is provided on the internal spherical surface 14 by virtue of the inward positioning of the bore 16 with respect thereto.

To engage the female member 10 I have provided a male torque transmitting member 19 which has at its inner end a spherically shaped head 20 which, as shown in Figure 1, fits in close mating agreement with the internal spherical surface 14 of the female member 10. A plurality of circumferentially spaced arcuate grooves 21, 21' and 21'' are provided in the head 20 and follow its spherical contours. The grooves 21, 21' and 21'' are, of course, the same in number as the bores 16, and are spaced for registry therewith. As means of locking the members 10 and 19 in mating position I have provided a ring member 28 which is secured to the inner end of the bulbous socket defined by surfaces 14 and 15, and which has spherically shaped inner and outer surfaces adapted to correspond with and continue the spherical inner and outer surfaces 14 and 15 of the socket defined thereby. To insure proper longitudinal positioning of the driving balls 17, the ring 28 is provided with a multiplicity of circumferentially spaced bores 29 which are positioned for registry with the bores 16 provided in the wall 12 of the female member 10. It should be noted, however, that while I have provided bores 29 to seat the driving balls 17, an annular recess or the like would serve equally well to restrict the balls 17 from longitudinal movement. The ring 28 may be secured to the members 10 by welding, as is shown at 30, or by suitable cap screws, not shown. The two principal parts 10 and 19 of the universal joint assembly are held together by the substantial longitudinal extent of the "over-center" spherical contact between the outer surface of the part 20 and the inner spherical surfaces of the assembled parts 15 and 28.

To provide sufficient clearance for angular movement between members 10 and 11 the spherical head 20 is truncated. A recess 22 is centrally positioned at the flat end of the head 20 and a pilot ball 23 is positioned in a spherical seat at the center of the recess 22. Extending inwardly from the center of the female or socket member 10 is a cylindrical sleeve 24 which may be formed integrally therewith, as shown, or which may be formed of a suitable section of tubing inserted therein. As shown, the aperture 25 through the sleeve 24 terminates at the inner end of a concentric axial bore 13 which is provided in the extending hub section 11 to slidably receive a transmission shaft, not shown. In accordance with usual practice suitable spline-receiving grooves or keyways, not shown, are provided to prevent rotation of the transmission shaft, not shown, with respect to its receiving hub 11.

Slidably received in the axial aperture 25 of the sleeve 24 is a piston-like member 26 which has a conical or similarly-shaped recess provided in its inwardly extending free end for registry with the pilot ball 23. A compressible coil spring 27 is also positioned in the aperture 25 and is adapted to bear against the piston-like member 26 to urge it against the pilot ball 23. It may be observed that the action of the piston-like member 26 against the pilot ball 23 will, in effect, yieldingly apply tension to the joint which will tend to eliminate any chatter which might otherwise occur due to looseness between the mating male and female sections.

Extending outwardly from the spherical head 20 is a cylindrical hub 31 which is adapted to receive, slidably but not rotatably, a second transmission shaft, not shown. At the inner shoulder of the hub and secured thereto by means of welds 33 and 34 I have provided a collar 32 to which is secured, also by means of welding, as at 35 and 36, an inwardly extending sleeve 37. A suitable lubricant seal 38 is retained in a recess provided therefor in the inside surface of sleeve 37. In accordance with usual practice the seal 38 is caused to bear on surface 15 to insure sealing contact therewith regardless of the angularity of the members 10 and 19.

Shown in Figure 2 of the drawing is another type of lubricant seal which may be used with my universal joint. The sealing member 39 comprises a cylindrical sleeve at 40 and an integral cup portion 41 which is generally spherical in contour and which extends inwardly to partially overlie the spherical surface 15. A bead 42 is formed at the inner end of the sealing member 39 to receive the sealing ring 38', which, of course, bears against surface 15. Any suitable means, not shown, of securing the sealing member 38 will suffice for mounting it to the hub 31. For reasons of economy of manufacture, however, I prefer welding.

It should be observed that as, for example, the socket member 10 is caused to rotate, there will be engagement between some of the driving balls and their retaining grooves to thereby cause the rotation of the mating member 19. Such angularity between the principal elements 10 and 19 as results, for example, from rocking movement of member 10 about an axis passing centrally through balls 17' and 23 (Fig. 3) will, of course, cause the driving balls 17, lying in the plane defined by the axes by said elements 10 and 19 to travel at a somewhat higher velocity than the grooves 21 which retain them. The balls 17' which are disposed at 90° from the first mentioned balls 17 will, however, have a velocity somewhat lower than that of their retaining grooves 21'. It may be understood, then, that at least one pair of opposing balls, positioned substantially at 17'' will have a velocity which is synchronous with that of these retaining grooves 21''.

Due to the above mentioned velocity differential between the driving balls 17 and 17' and their respective retaining grooves 21 and 21', each of the grooves 21, 21' and 21'' must be sufficiently wide to allow motion relative to the balls 17, 17' and 17'' since, obviously, each of the balls will occupy these various positions during rotation.

It should be clear that only the synchronously travelling balls at 17'' will have driving engagement with the driven member (19 in this illustration). It should further be clear that, due to the multiplicity of symmetrically arranged balls, there will be a pair of driving balls at or in the proximity of 17'' during all phases of rotation. Since over a small arc the transmitted motion will be essentially constant, and since each pair of balls will drive over only a small arc, the transmitted motion will be of substantially constant ratio throughout a complete revolution. The greater the number of driving balls used, of course, the more constant the transmission ratio. Practical limitations should, therefore, determine the number of balls to be used in each application.

From the foregoing disclosure it should be apparent that I have accomplished the objects initially set forth. I have provided a universal joint which is operative to transmit rotary motion between angularly disposed shafts at a substantially constant ratio. My universal drive is, nevertheless, of extreme simplicity of design and may be manufactured by common machining operations and standard parts. I have further provided means to eliminate chattering due to looseness of the mating parts as might occur through long use.

As is illustrated in Figure 5 of the drawing the driving balls 17 of my universal joint may be replaced by barrel-shaped rollers 17a. This alternate construction may be desirable for the transmission of high torque since the contact area of the rollers 17a is somewhat greater than that of the balls 17.

The above described embodiments of my invention should, however, be considered as illustrative only, since numerous alterations may be made in the specific design or structure without departing from the spirit or scope of the invention. Reference should therefore be made to

I claim:

1. In a universal type drive the combination of a female member having at one end a bulbous socket defined by two concentric spherically-shaped surfaces, said female member having a multiplicity of circumferentially spaced axial bores positioned in the wall section between said spherically-shaped surfaces in open communication with at least the inner of said surfaces, a male member having at one end a spherically-shaped head and having a multiplicity of circumferentially spaced grooves therein adapted for registry with said communicating axial bores, a multiplicity of balls adapted to be retained in said axial bores and adapted to engage said grooves in said male member, a ring member adapted to be retained on the open end of said female member to thereby substantially prevent the axial movement of said male member with respect to said female member and of said balls in said axial bores, said grooves being of greater circumferential dimensions than the circumferential dimensions of said balls whereby said male and female members may have angular driving relation and means comprising a pilot ball retained in said male member and a compressible coil spring retained in said female member to maintain said male and female members under constant tension.

2. A universal joint comprising a member having a truncated inner spherical surface defining a socket, a plurality of circumferentially spaced bores in the side wall of said member extending longitudinally inward of the open end of said member and intersecting said surface, said bores extending through the plane normal to the longitudinal axis of said member which intersects the maximum internal diameter of said socket, a second member having an outer spherical surface complementary to said first mentioned spherical surface and lying in contact therewith and extending into said socket beyond said plane, said second member having a plurality of arcuate longitudinally extending slots in its outer spherical surface in circumferential registry with said bores, a rounded driving member in each of said bores and extending partially into the adjacent slot of said second member, said slots having greater circumferential dimensions than the circumferential dimensions of said rounded driving members whereby said first mentioned member and said second member may have angular driving relation, a ring rigidly secured to the open end of the first member and engaging said driving members to retain the same substantially within said plane, the inner periphery of said ring being spherically shaped complementary to said outer spherical surface of said second member and engaging the same outwardly of said plane whereby said first and second members are restrained against axial separation, a centrally disposed semi-spherical seat in said second member and lying substantially within said plane, a ball partially received within said seat, and a spring-pressed plunger mounted centrally in the base of said socket and aligned with the longitudinal axis thereof for engaging said ball.

LOTHAR S. HEYM.

References Cited in the file of this patent

UNITED STATES PATENTS

| Number | Name | Date |
|---|---|---|
| 1,311,679 | Chalifoux | July 29, 1919 |
| 1,838,310 | Hubbel | Dec. 29, 1931 |
| 2,006,026 | Midthun | June 25, 1935 |
| 2,140,295 | Mallard | Dec. 13, 1938 |
| 2,182,455 | Smith | Dec. 5, 1939 |
| 2,283,139 | Herget | May 12, 1942 |